April 16, 1935.     E. A. FUCHS     1,998,419

RAT TRAP

Filed March 9, 1934

Inventor

E. A. FUCHS

By Mason Fenwick Lawrence

Attorney

Patented Apr. 16, 1935

1,998,419

UNITED STATES PATENT OFFICE 1,998,419

RAT TRAP

Eugene A. Fuchs, Atlanta, Ga., assignor, by direct and mesne assignments, to Douglas N. Mc-Curdy, Stone Mountain, Ga.

Application March 9, 1934, Serial No. 714,868

4 Claims. (Cl. 43—83)

The invention forming the subject matter of this application relates in general to animal traps, and particularly to traps designed to kill animals of the rodent type, such as rats, mice, etc.

The main object of the invention is to provide a trap of this character which can be readily manufactured in large quantities and sold at low cost for household use, or wherever traps of this kind may be used.

Another object of the invention is to provide an animal trap of the character described, which can be set and reset without the necessity of applying the hands of the user to the operative parts of the device. In prior manually settable devices of this type, especially in those designed to kill or trap comparatively large animals, the strength of the operating spring mechanism frequently causes injury to the hands of the persons setting the same. In the present invention the setting elements are arranged out of the paths of movement of the actual trapping or killing elements, and are designed to be set and reset by pressure applied thereto, either manually or by any suitable means.

It is generally known that most persons have a repugnance to actually handling a trap of this kind, either to set the trap or release the trapped animal, especially if the animal be of the unsanitary rodent type. It is, therefore, a further object of this invention to provide a trap of this character which can be set and reset and released without it being necessary for any person to apply any part of their body thereto. This is also desirable, because as is well known, animals of the rodent type avoid devices of this character, having the human scent resulting from manual operation in the setting or releasing thereof.

Other objects of the invention will become apparent as the detailed description thereof proceeds.

Figure 1:
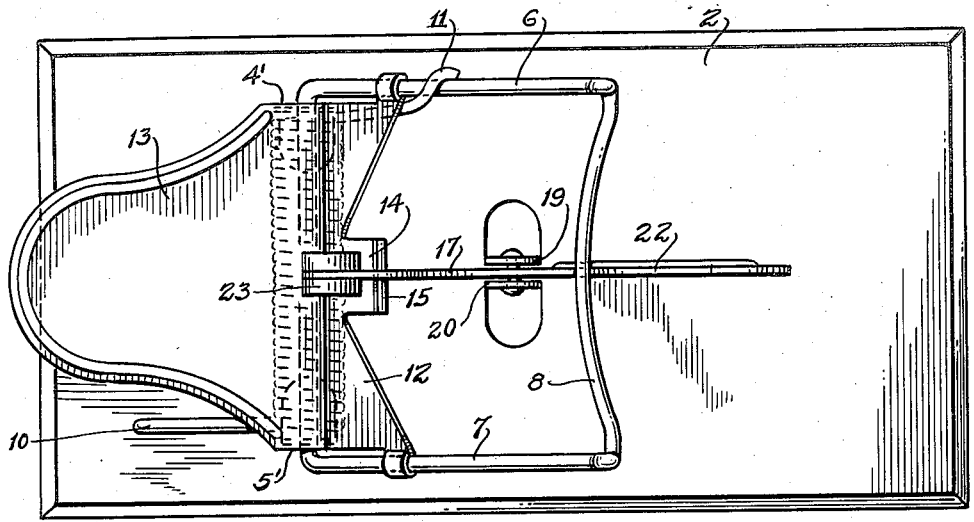
Figure 1 is a plan of the animal trap with the parts thereof shown in set position.

As illustrated in the drawing, the invention comprises trapping mechanism, designated generally by the reference numeral 1, operably mounted on a base plate 2, which may be made of any suitable material, but is preferably stamped out of sheet metal. This mechanism includes a substantially rectangular frame having an end rod 3 mounted to rotate in bearing apertures formed in pivot lugs 4 and 5, stamped up from the base plate 2.

The sides 6 and 7 of the frame extend from opposite ends of the pivot rod 3, and have their outer ends connected to the striking bar 8, which is preferably offset downwardly from the plane of the sides 6 and 7 to enhance the striking effect when the frame is released. This frame is intended to be made of stiff wire, the gauge of which will, of course, depend upon the size of the trap and the animals upon which it is intended to operate.

A coil spring 9, wound around the rod 3, has one end 10 suitably secured to the base 2, and has its other end 11 extended to engage the side 6 of the frame. As will be obvious from inspection of the drawing, the torsion of the spring 9 is such as normally to force the free or striking end 8 of the frame toward the base 2.

A plate 12 has its opposite ends bent around the sides 6 and 7 of the frame, and is pivoted to the rod 3 by means of the pivot lugs 4' and 5' stamped downwardly to extend over and register with the lugs 4 and 5, respectively. A pedal 13 extends angularly from the plate 12 and over the spring 9 and toward the rear end of base 2. The outer end of this pedal may obviously be depressed toward the rear end of base 2 by means of a stick or rod of any kind, or can be depressed by the hand or foot of the person using the trap.

Figure 2:
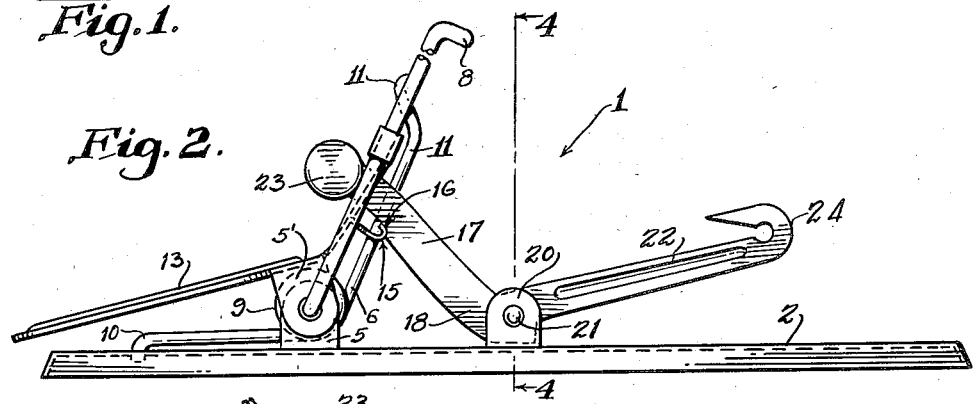
Figure 2 is a side elevation of the trap with the parts thereof substantially in the set position illustrated in Figure 1.
Figure 3:
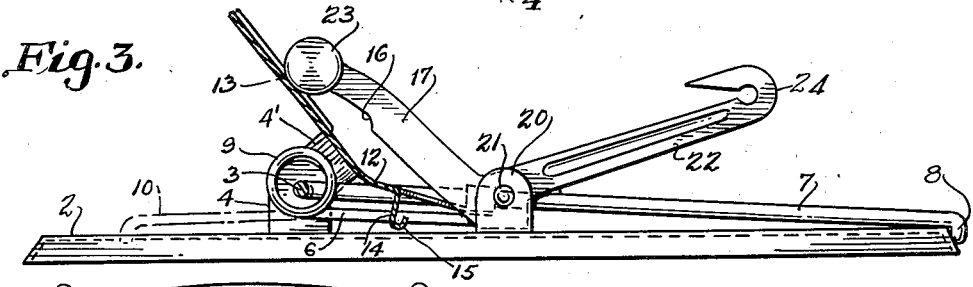
Figure 3 is a fragmentary side elevation of the trap, similar to Figure 2, but with the elements of the invention in operated or trapping position, and with parts broken away and shown in section.
Figure 4:
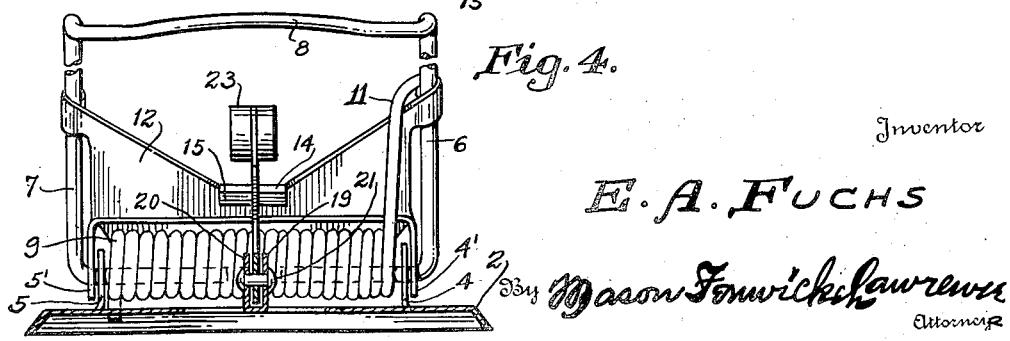
Figure 4 is a fragmentary vertical transverse section taken on the line 4—4 of Figure 2.

In order to set the trap; that is, to hold the frame with its outer end 8 in the raised position shown in Figures 1 and 2 of the drawing, the plate 12 has a trigger lug 14 projecting laterally therefrom. The free edge of the lug 14 is bent, or otherwise suitably shaped, to form a rounded edge 15, adapted to be received in a notch 16 formed at the end of one arm 17 of a bell crank trigger lever suitably pivoted at its elbow 18 between the pivot lugs 19 and 20, stamped up from the base plate 2, by means of the pivot 21.

The other arm 22 of the bell crank trigger lever is normally overbalanced by the weight 23 on the outer end of arm 17. The outer end 24 of this arm 22 is shaped as a hook adapted to hold an suitable material which may be used as an animal bait.

When the trap is set as shown in Figures 1 and 2, it is obvious that any pull applied to the bait end of the arm 22 will cause the lower curved end of the notch 16 to ride up over the rounded edge 15 of the plate 14 and thereby release the frame from the trigger lever. The spring 9 then snaps the frame toward the base 2 and causes the outer end 8 of the frame to strike and trap or kill any animal pulling at the bait. Whenever it becomes necessary to release the trapped animal, or to reset the trap, the operator may do so merely by pressing the pedal 13 toward the rear end of base 2. This pressure causes the rounded edge 15 of the lug 14 to slide over the lower edge of the lever arm 17 until it snaps into the notch 16. The torsion of the spring 9 then holds the several elements of the trap releasably in set position.

It is obvious that the frame 12 and the pedal 13 connected thereto form a bell crank lever which is pivoted at its elbow by means of the rod and pivot lugs 4 and 5 to the base plate 2. The invention thus comprises two simple cooperating bell crank levers pivoted to the base about axes parallel to each other and having elements cooperating to hold the trap releasably set. The invention is therefore one of extreme simplicity, which can have the elements thereof manufactured on a production scale.

It will be apparent that minor changes may be made in the form and construction of the invention without departing from the material spirit thereof. It is not, therefore, desired to confine the invention to the exact form herein shown and described, but it is desired to include all such as properly come within the scope claimed.

What I claim is:

1. An animal trap comprising a base, a frame pivoted at one end to said base, a coil spring connected to said frame and base for normally forcing the free end of said frame toward said base, a bell crank lever having one arm secured to said frame and having its other arm extending as a pedal at an angle therefrom, a bell crank bait holding lever pivoted at its elbow to said base to rotate about an axis parallel to said base and having a latch arm extending toward the pivoted end of said frame, and cooperating latching means on said frame engaging arm and latch arm for holding the frame releasably in a predetermined angular relation to said base.

2. An animal trap comprising a base, a substantially rectangular frame pivoted at one end to said base, a spring connected to said frame and base for normally forcing said frame toward said base, a plate secured to said frame adjacent its pivoted end, a pedal projecting from said plate rearwardly of said frame, a bait holding lever pivoted intermediate its ends to said base to rotate about an axis parallel to said base, and having one arm movable toward and from the pivot end of said frame, and a lug projecting from said plate and having its outer edge adapted to seat in a notch formed in the end of said arm to lock the frame releasably in a predetermined angular relation to said base.

3. An animal trap comprising a base, a substantially rectangular frame pivoted at one end to said base, a spring connected to said frame and base for normally forcing said frame toward said base, a plate secured to said frame adjacent its pivoted end, a pedal projecting from said plate rearwardly of said frame, a bait holding lever pivoted intermediate its ends to said base to rotate about an axis parallel to said base, and having one arm movable toward and from the pivot end of said frame, a lug projecting from said plate and having its outer edge adapted to seat in a notch formed in the end of said arm to lock the frame releasably in a predetermined angular relation to said base and means on said arm for overbalancing said bait holding lever to maintain the notched end thereof in operative contact with the outer edge of said lug.

4. An animal trap comprising a base, a substantially rectangular frame pivoted at one end to said base, a spring connected to said frame and base for normally forcing said frame toward said base, a plate secured to said frame adjacent its pivoted end, a pedal projecting from said plate rearwardly of said frame, a bait holding lever pivoted intermediate its ends to said base, and having one arm movable toward and from the pivot end of said frame, a lug projecting from said plate and having its outer edge adapted to seat in a notch formed in the end of said arm to lock the frame releasably in a predetermined angular relation to said base, means for overbalancing said bait holding lever to maintain the notched end thereof in operative contact with the outer edge of said lug, and a stop acting in opposition to said means for limiting the movement of said notched arm toward the pivot end of said frame.

EUGENE A. FUCHS.